United States Patent
Moore et al.

(10) Patent No.: US 8,285,722 B2
(45) Date of Patent: Oct. 9, 2012

(54) CONTENT DISCOVERY USING GATEWAY BROWSING DATA

(75) Inventors: Edward Moore, Herts (GB); Martin Higham, Berkshire (GB); Robert Finean, London (GB); Sean MacNeill, Mountain View, CA (US)

(73) Assignee: Unwired Planet, Inc., Redwood City, CA (US)

( * ) Notice: Subject to any disclaimer, the term of this patent is extended or adjusted under 35 U.S.C. 154(b) by 306 days.

(21) Appl. No.: 12/512,962

(22) Filed: Jul. 30, 2009

(65) Prior Publication Data

US 2010/0138423 A1  Jun. 3, 2010

Related U.S. Application Data

(60) Provisional application No. 61/084,959, filed on Jul. 30, 2008.

(51) Int. Cl.
*G06F 7/00* (2006.01)
*G06F 17/30* (2006.01)

(52) U.S. Cl. ......................................................... 707/741

(58) Field of Classification Search .................... 707/741
See application file for complete search history.

(56) References Cited

U.S. PATENT DOCUMENTS

2007/0260635 A1 * 11/2007 Ramer et al. ............... 707/104.1
* cited by examiner

*Primary Examiner* — Robert Beausoliel Jr
*Assistant Examiner* — Nicholas Allen

(57) ABSTRACT

An internet browsing gateway is utilized to locate mobile web content and improve search capabilities for wireless devices. Mobile browsing data is logged as web pages are requested from and returned to wireless devices associated with the same wireless network. An index server continually updates search indexes in real time as users request searches and search results are returned. As a result, the mobile content that is discovered becomes more relevant for users of the same wireless network or mobile carrier. In other words, the search results are more localized in accordance with the location of the wireless network that services the mobile users within a specific geographic region. When a web search is requested from a wireless device, the index server queries the search indexes. The search results are ranked using a search algorithm that incorporates the browsing data to improve the accuracy and relevance of searches.

16 Claims, 6 Drawing Sheets

CONTENT DISCOVERY USING GATEWAY BROWSING DATA

CROSS-REFERENCE TO RELATED APPLICATIONS

This application claims priority to U.S. Provisional Patent Application No. 61/084,959, filed on Jul. 30, 2008, which is incorporated herein for all purposes.

TECHNICAL FIELD

The present invention relates to the field of internet gateway capabilities and usage analytics and, more specifically, to the application of gateway usage data to improve internet content discovery for users of mobile devices.

BACKGROUND

Internet web sites are accessible by a variety of different computing devices such as personal computers (PCs) and wireless devices including mobile phones and personal digital assistants (PDAs). Some web site domains contain web pages designed for specific browsers. The configuration of the web pages may be different depending on the browser used to access the web site. For example, a PC has a larger display than a typical wireless device. Thus, a web site designed for a browser used with a PC may include more content and features per page than a web site designed for access by a wireless device.

Many web sites are designed for access only by a PC browser. In many cases, it may be difficult to determine which web sites include content compatible with wireless devices. If a web site domain designed for a PC is accessed by a wireless device, a web page retrieved from that web page must be adapted for use by the wireless device by converting elements of the web page into a format that is suitable for the wireless device browser. A growing number of web sites serve different versions of web pages depending on whether or not a non-PC based browser is used to request a page. However, it is difficult to identify which domains have enabled this capability and which sites may further sub-divide or modify the presentation of the requested content based on individual models or capabilities of the wireless devices requesting a page.

When mobile web users conduct a search, many aspects of the search experience are less than optimal relative to a PC-based search and could be improved. In one example, search results may come from domains that have web pages formatted for mobile browsers. However, the search results may also be associated with web pages that are designed only for PC browsers, or are not optimized for presentation using a mobile device browser. In another example, the search results may be provided by a global search engine that searches the general internet space without regard to specific local mobile carriers. Thus, only search results that are globally popular may be returned while content that is only popular within a specific culture, country or geographic region may be overlooked.

Whether or not the search results come from mobile-friendly web pages may adversely affect the ranking of the search results in the sense of which results may be most relevant to a user of a mobile device. This is because PC-compatible web sites are commonly ranked based on how many other domains or web pages link to the site. However, this method of ranking search results is less useful for wireless-compatible web sites because the mobile web is fragmented and has less cross-linking than standard, PC-based web sites. Since fewer mobile-friendly web pages link to other mobile-friendly web pages and the mobile web is smaller than the standard web, it is difficult to identify which search results contain the most popular or useful information for a user of a mobile device.

Other factors may adversely affect the ranking of search results or the usefulness of such ranking when a search is requested from a wireless device. Due to the single country-based nature of mobile networks, mobile browsing is a more localized phenomena than the standard world wide web. As a result, there is commonly insufficient capability in many commercial search engines to differentiate between unique mobile device users. In addition, new additions to an index of mobile-compatible web pages may be delayed such that the searching of quickly evolving web pages may not return the most current content. Lastly, search results from mobile-friendly web sites may be corrupted by publishers looking to enhance rankings by employing a range of techniques to circumvent existing search algorithms.

Therefore, what is needed are better methods for identifying web sites that are compatible with wireless devices and for discovering relevant mobile-friendly web content.

SUMMARY

Embodiments of the present invention utilize an internet browsing gateway to discover relevant mobile web content and improve search capabilities for mobile wireless devices based on browsing data of users of mobile devices associated with the same wireless network or mobile carrier in a specific geographic region. The mobile browsing data is logged as web pages are requested from and returned to the wireless devices. An index server of a search engine updates search indexes in real time based on the log data to facilitate usage of the search engine by the mobile device users. The search indexes are continually updated as users request searches and search results are returned. As a result, the mobile content that is discovered becomes more relevant for users of the same wireless network or mobile carrier. In other words, the search results are localized in accordance with the location of the wireless network that services the mobile users within a specific geographic region.

When a web search is requested from a mobile wireless device, the index server queries the search indexes. The search results are ranked by popularity using a search algorithm that incorporates the browsing activity of the mobile devices to refine search result ranking and improve the accuracy and relevance of searches for mobile device users. The search algorithm provides weight to each search result by increasing or decreasing a ranking value based on whether certain usage conditions are met, where such usage conditions are indicative of the value or relevance of the search results to the mobile device users. The index server then returns the results of the query to the mobile wireless device, and the search results are displayed based on the ranking values.

In accordance with some embodiments of the present invention, a method is provided for discovering mobile-compatible web content. The method includes retrieving web pages in response to requests received from requesting wireless devices that are associated with a same wireless network. At least some of the retrieved web pages include wireless-compatible content. Usage data associated with each of the retrieved web pages is stored. A ranking value is generated for each retrieved web page. The ranking value is generated based on usage data associated with the corresponding retrieved web page. The retrieved web pages are indexed based on the associated usage data. The indexed web pages include wireless-compatible content. The indexed web pages are identified in response to receiving search terms from a wireless device. The identified web pages correspond to the received search terms. The identified web pages are ranked based on the corresponding ranking values to identify popular content requested from a location served by the wireless network associated with the requesting wireless devices.

In accordance with some embodiments of the present invention, a system for discovering mobile-compatible web content includes a browsing gateway and a search engine. The browsing gateway includes a data collector configured to retrieve web pages in response to requests received from requesting wireless devices associated with a same wireless network. At least some of the retrieved web pages include wireless-compatible content. The data collector is also configured to store usage data associated with each of the retrieved web pages. The search engine includes a web crawler and an index server. The web crawler is configured to receive the usage data from the data collector. The received usage data corresponds to the retrieved web pages that include wireless-compatible content. The index server generates a ranking value for each retrieved web page. The ranking value is generated based on usage data associated with the corresponding retrieved web page. The index server indexes the retrieved web pages based on the associated usage data. The indexed web pages include wireless-compatible content. The index server identifies the indexed web pages in response to receiving search terms from a wireless device. The identified web pages correspond to the received search terms. The index server also ranks the identified web pages based on the corresponding ranking values to identify popular content requested from a location served by the wireless network associated with the requesting wireless devices. The index server then returns the ranked web pages to the wireless device that sent the search terms.

These and other advantages of embodiments of the invention will be apparent to those of ordinary skill in the art by reference to the following detailed description and the accompanying drawings.

DETAILED DESCRIPTION

Figure 1:
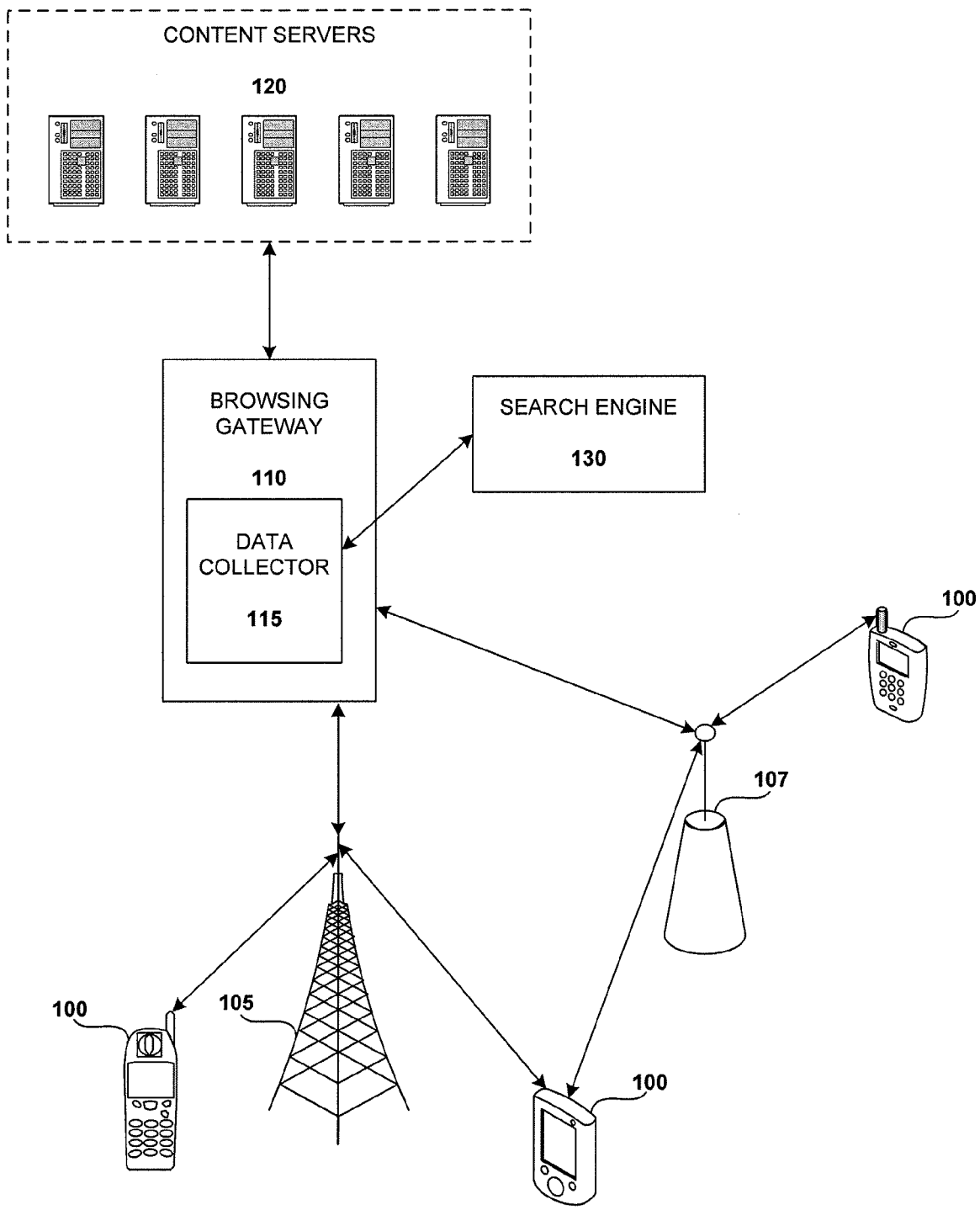
FIG. 1 is a functional block diagram of a system for enhancing internet content discovery of wireless devices based on gateway usage data, in accordance with embodiments of the present invention.

Embodiments of the present invention utilize an internet browsing gateway to discover content and improve search capabilities of a wireless device based on browsing and usage data of users of mobile devices. The mobile usage data is reflective of the value or relevance of the search results to users of mobile devices. The browsing gateway includes a data collector that logs mobile browsing data as web pages are requested from and returned to the wireless devices associated with the same wireless network or mobile carrier. The browsing data may identify whether the requested pages are retrieved from a mobile-compatible web site. A data collector generates log data files based on the data from the retrieved pages and usage data associated with the pages. An index server of a search engine updates search indexes of a web crawler in real time based on the log data received from the data collector to facilitate usage of a search engine by the mobile device users associated with the same localized wireless network. The data collector may automatically separate browsing activity based on content type so that only data types relevant to wireless devices are sent to the index server for indexing. As a result, data that may not be present in standards logs is provided to the index server for enhancing mobile search capabilities. The search indexes are continually updated as users request searches and search results are returned. As a result, the mobile content that is discovered becomes more relevant for users of the same wireless network or mobile carrier. In other words, the search results are localized in accordance with the location of the wireless network that services the mobile users within a specific geographic region.

When a web search is requested from a mobile wireless device, the index server queries the search indexes of a web crawler to locate pertinent search results. The search indexes include the usage data generated during the page request/retrieval by all mobile device users that use the same wireless network or mobile carrier to improve the accuracy and value of search results. The search results are ranked by popularity using a search algorithm that incorporates the browsing activity of the mobile devices in the same wireless network to refine search result ranking and improve the relevance of searches for mobile device users. The search algorithm provides weight to each search result by increasing or decreasing a ranking value based on whether certain usage conditions are met, where such usage conditions are indicative of the value or relevance of the search results to the mobile device users. The index server then returns the results of the query to the wireless device, and the search results are displayed based on the ranking values.

Many advantages are provided by using the browsing data to enhance search results. Since browsing activity is automatically logged in real time, sites of interest may be easily located to web-crawl and build indexes. The browsing data also aids in the automatic identification of web sites that are mobile friendly. In addition, standard PC-focused web sites that are popular with mobile web users may be stored after being adapted for mobile compatibility such that the web page content need not be adapted again when requested from a wireless device.

FIG. 1 is a functional block diagram of a system for enhancing internet content discovery of wireless devices based on gateway usage data, in accordance with embodiments of the present invention. The system includes wireless devices 100 that operate within the same wireless network that may be operated by a single mobile carrier, an internet browsing gateway 110, at least one content server 120 and a search engine 130. The wireless devices 100 communicate with the browsing gateway 110 via a radio tower 105 or a wireless access point 107. The browsing gateway 110 includes a data collector 115. As described in detail below, the data collector 115 generates log data files based on data from retrieved mobile web pages and usage data associated with the pages.

Figure 2:
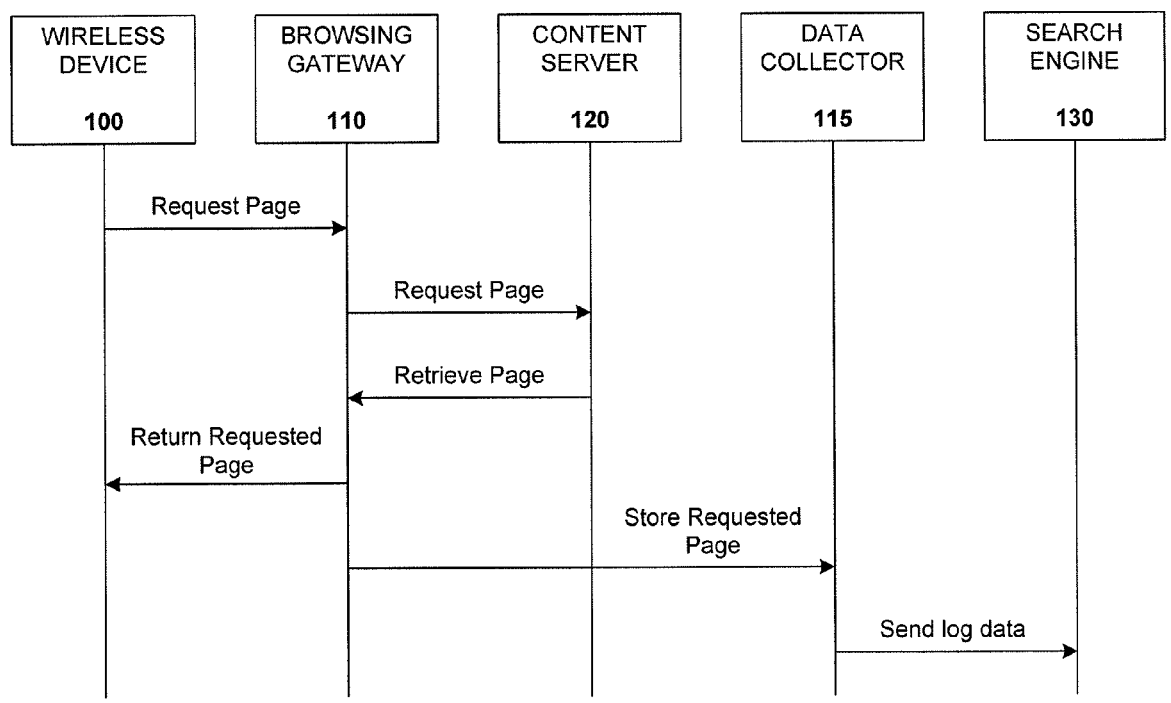
FIG. 2 illustrates a data flow associated with the system of FIG. 1 for enhancing internet content discovery of a wireless device based on gateway usage data.

FIG. 2 illustrates a data flow associated with the system of FIG. 1 for enhancing internet content discovery of a wireless device based on gateway usage data. The wireless device 100 requests a web page from the browsing gateway 110. The browsing gateway 110 retrieves the requested page from the content server 120, performs any necessary actions on the retrieved page (e.g., adaptation, compression, etc.) and then returns the requested web page to the wireless device 100.

The browsing gateway 110 typically logs data associated with the page fetch for analytical or billing purposes. However, in accordance with some embodiments of the invention, additional data may also be logged for use in improving the accuracy and relevance of search results that may not be present in standard logs. For example, the log entry may identify the particular wireless device that requested the page, the time that the page was requested, the length of time that the web site domain or page was browsed, the number of unique users who have accessed the web site over a specific time period, a referring web site, a text synopsis of the page and the page content for cache access, etc. Since usage and browsing activity for actual users is automatically logged, sites of interest can be easily and accurately located and indexed, as discussed in further detail below.

The browsing gateway 110 also identifies whether the requested pages are retrieved from a mobile-compatible web site. Many standard PC-focused web sites are popular with mobile web users. Pages retrieved from these sites may be converted for display on mobile devices by utilizing content adaptation techniques.

In accordance with some embodiments of the invention, the usage data generated during the page request/retrieval can be used to refine search results. The browsing gateway 110 provides the page requested by the wireless device 100 that was retrieved from the content server 120 to the data collector 115. The data collector 115 prepares log data files based on the data from the retrieved page and the usage data associated with the page, and then forwards the log data files to the search engine 130. Thus, the search engine 130 may update a search index in real time based on the log data received from the data collector 115. The search engine 130 continually updates the search indexes as the wireless devices 100 associated with the same wireless network or mobile carrier request and retrieve mobile content.

Figure 3:
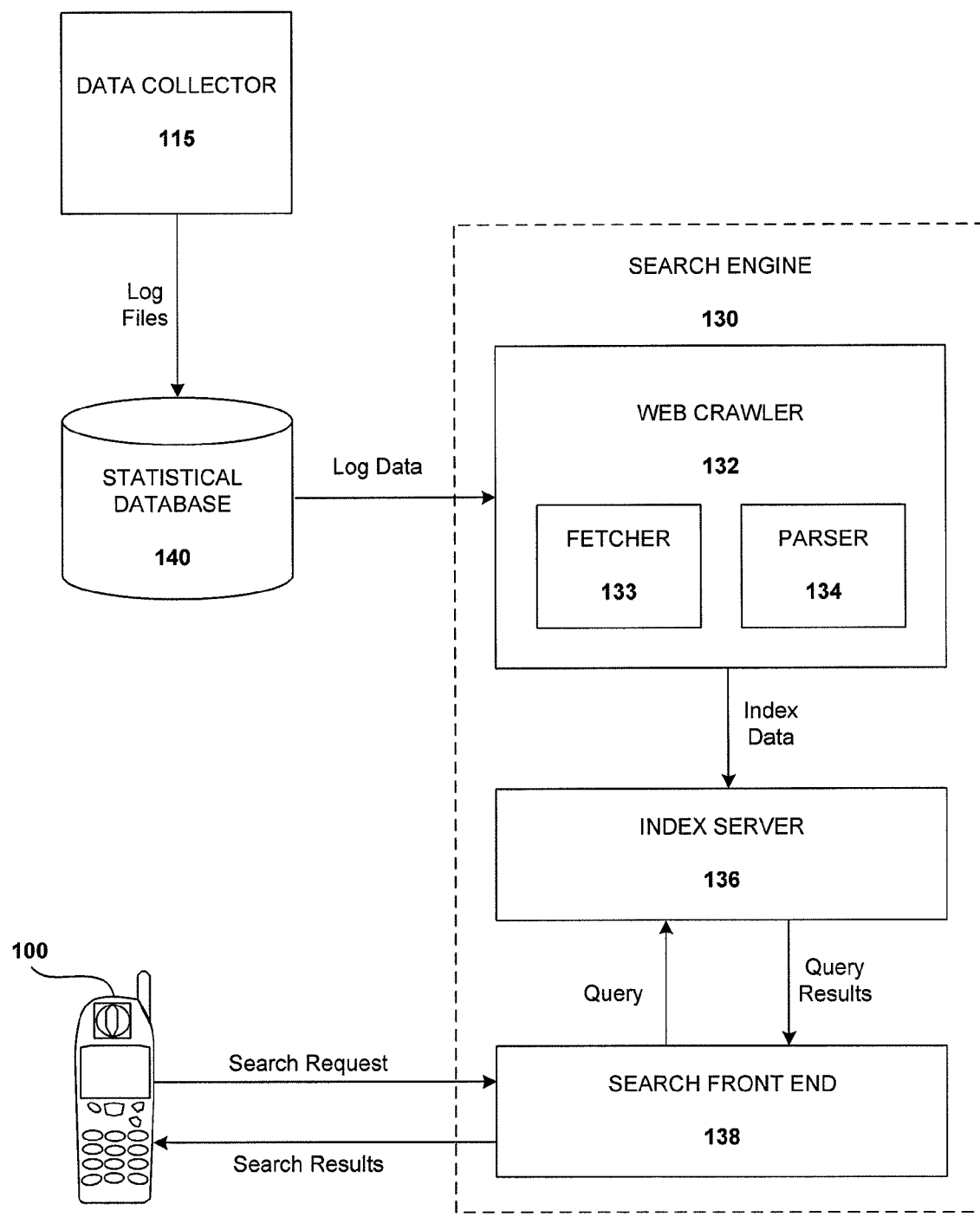
FIG. 3 is a block diagram illustrating an embodiment of a search engine of the system of FIG. 1 for enhancing internet content discovery of a wireless device based on gateway usage data.

FIG. 3 is a block diagram illustrating an embodiment of a search engine of the system of FIG. 1 for enhancing internet content discovery of a wireless device based on gateway usage data. The search engine 130 includes a web crawler 132, an index server 136 and a search front end 138. The web crawler 132 includes a fetcher 133 for data retrieval and a parser 134. The web crawler 132 may be any module developed for searching the internet such as a Nutch module. The index server 136 may be an HTTP-based search application such as a SOLR module.

The data collector 115 provides the log data files (discussed with reference to FIG. 2) to a statistical database 140. The log data files are then provided to the web crawler 132 as raw data that is parsed by the parser 134. The web crawler 132 enhances the log data and accelerates fetching and parsing. Enhancements to search results based on usage data are made in the index server 136, which indexes the web pages collected by the data collector 115. The extra browsing data that assists with page ranking is included as part of the index data. A master index is generated based on all of the available information associated with the pages. The search results are ranked, for example, by tracking the popularity of certain web sites and pages based on the usage data.

The wireless device 100 requests a search at the search front end 138 based on search terms that may be entered by a user. The search front end 138 may correspond to a mobile web service. The search front end 138 queries the index server 136 for the requested information. A query search is then performed by the index server 136 against the indexes built by the web crawler 132. The index server 136 then returns the results of the query to the wireless device 100 via the search front end 138. The returned results are ranked by popularity and displayed on the wireless device 100, as described below.

Figure 4:
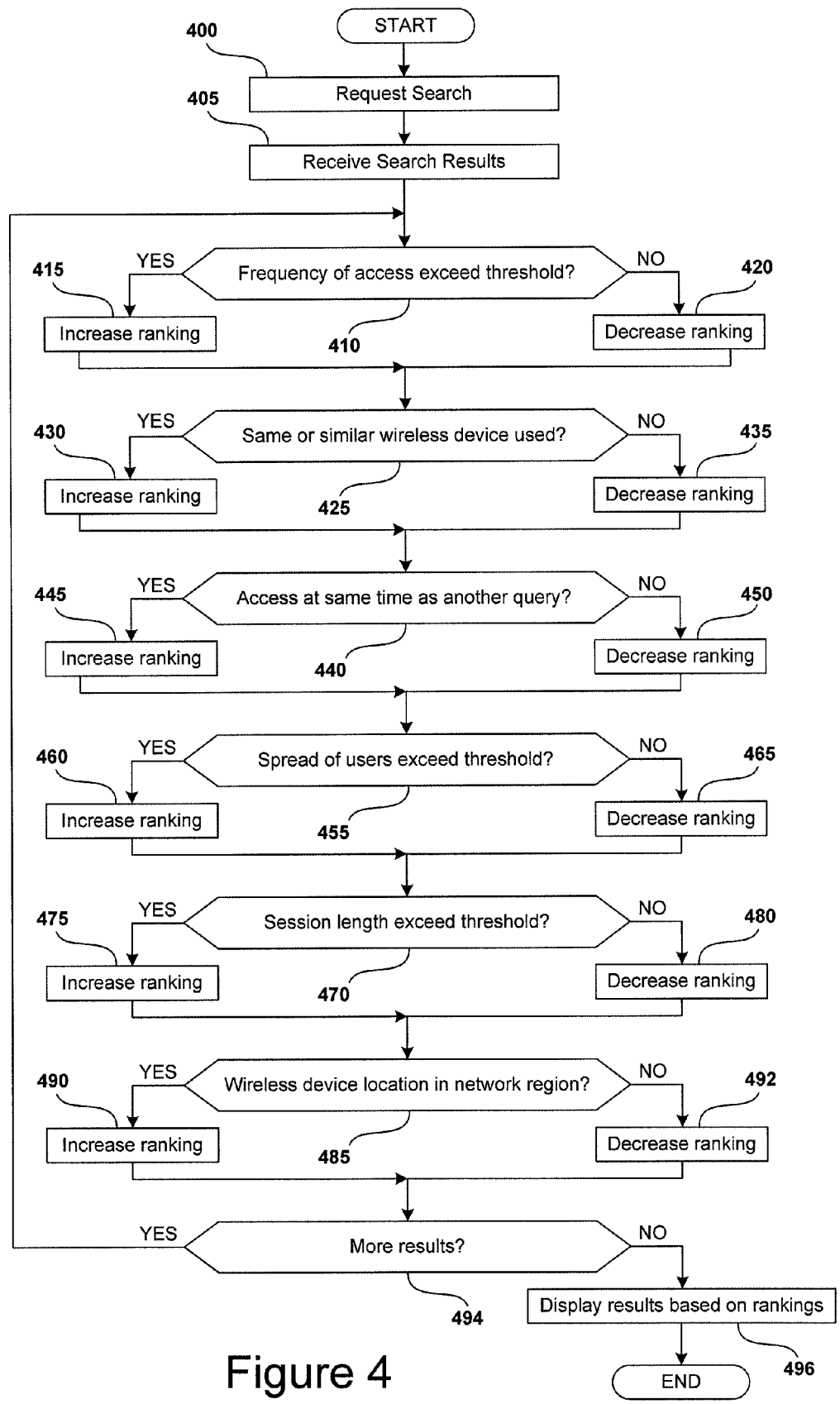
FIG. 4 is a flow diagram illustrating a process of refining rankings of internet search results requested from a wireless device, in accordance with embodiments of the present invention.

As described, in embodiments of the invention, the browsing activity of wireless devices in a specific geographic region can be used in a search algorithm to refine search result ranking for that region and thereby improve the accuracy and relevance of localized searches. FIG. 4 is a flow diagram illustrating a process of refining rankings of internet search results requested from wireless devices associated with the same wireless network or mobile carrier, in accordance with embodiments of the present invention. A wireless device requests a search from a web service based on user-entered search terms (step 400) and the index server receives the search results from the web crawler (step 405), as described above with reference to FIG. 3.

The index server then provides weight to each search result by increasing or decreasing a ranking value based on whether certain conditions are met. A number of different conditions are illustrated below, however, one having ordinary skill in the art would appreciate that other conditions may be provided or any of the example conditions may be removed without departing from the scope of the invention. For example, other conditions that may be used to provide weight to a search result value include whether or not a web page was referred from a high-traffic domain.

As an example, for each search result, a determination may be made whether or not the frequency of page/domain access for the requesting wireless device exceeds a threshold (step 410). If the frequency of page/domain access exceeds a maximum threshold, then processing proceeds to step 415 where the ranking value of a search result is increased. For example, a wireless device may access the same domain that includes the search result ten times over the course of one day. If the maximum threshold is set at five domain accesses per day for one wireless device, then a ranking value of a search result that is associated with that domain would be increased. If the frequency of page/domain access does not exceed a minimum threshold, then processing proceeds to step 420 where the ranking value is decreased. For example, a search result may correspond to a web page that is accessed twice a month. If the minimum threshold is set at twenty five page accesses per month, then a ranking value of a search result that is associated with that web page would be decreased.

Another condition for refining the ranking of the search results includes a determination of whether or not the same or a similar wireless device is being used to access a search result as the wireless device that was used previously to access the same search result (step 425). Each wireless device may be associated with a unique identifier such as a telephone number or an IP address. In some cases, a wireless device may be associated with a different wireless device (e.g., a user operates a mobile telephone and a personal digital assistant). In such a case, the wireless devices may be associated with the same wireless service provider. If the same or a similar wireless device (i.e., associated with the same user) is being used, then processing continues to step 430 where the ranking value for the search result is increased. For example, the search result may be accessed by the same user using her mobile telephone and her personal digital assistant during the same day. However, if a wireless device has never previously accessed the domain associated with the search result, then processing continues to step 435 where the ranking value for the search result is decreased.

An additional condition for refining the ranking of the search results may include a determination of whether or not the page/domain is accessed at substantially the same time as another query (step 440). For example, two different users associated with the same mobile carrier may access the same domain at substantially the same time (e.g., a time stamp for each access may be less than a minute apart), providing an indication that it is likely that the domain is popular with many users. Similarly, a user may retrieve a search result from a web page that has not been accessed by another user associated with the same mobile carrier for an extended period of time (e.g., at least twelve hours). If the page/domain is accessed at substantially the same time as a different query from a different user, then processing moves to step 445 where the ranking value for the search result is increased. If the page/domain is accessed at a distinctly different time than a previous query, then processing advances to step 450 where the ranking value for the search result is decreased.

In another example of a condition for refining the ranking of the search results, a determination may be made whether or not the number of users associated with the same wireless network or mobile carrier that access the page/domain over a certain time period exceeds a threshold (step 455). If the number of users accessing the page/domain exceeds a maximum threshold, then processing proceeds to step 460 where the ranking value for the search result is increased. For example, a search result may correspond to a domain that is accessed by fifty thousand unique users per month. If the maximum threshold is set at twenty thousand unique users per month, then a ranking value of a search result that is associated with that domain would be increased. If the number of users accessing the page/domain does not exceed a minimum threshold, then processing moves to step 465 where the ranking value for the search result is decreased. For example, a search result may correspond to a web page that is accessed by fifty unique users per day. If the minimum threshold is set at five hundred unique users per day, then a ranking value of a search result that is associated with that web page would be decreased.

An additional example of a condition for refining the ranking of the search results might include a determination of whether or not a length of time that a user continuously accesses a web site exceeds a threshold (step 470). If the length of the user session exceeds a maximum threshold, then processing proceeds to step 475 where the ranking value of the search result is increased. For example, a user may remain at the same domain for thirty continuous minutes. If the maximum threshold is set at fifteen minutes, then a ranking value of a search result that is associated with that domain would be increased. If the length of the user session does not exceed a minimum threshold, then processing advances to step 480 where the ranking value of the search result is decreased. For example, a user may remain at the same web page for fifteen seconds. If the minimum threshold is for that web page is set at one minute, then a ranking value of a search result that is associated with that web page would be decreased.

Another example of a condition for refining the ranking of the search results might include a determination of whether or not a location of the wireless device that requested the search is included in a region served by the wireless network as other requesting wireless devices (step 485). If the location of the wireless device is in the same region served by the wireless network, then processing proceeds to step 490 where the ranking value of the search result is increased. If the wireless device is not in a region served by the wireless network, then processing advances to step 492 where the ranking value of the search result is decreased. This feature of the invention improves the ranking of localized search results that correspond to a specific geographic region.

Based on the described exemplary usage characteristics (or other suitable and relevant measures), after the final ranking value for a search result is determined based on application of the relevant conditions, a determination is made whether there are more search results to be ranked (step 494). If there are more search results to be ranked, processing returns to step 410 where the next search result is ranked at least according to some of the conditions discussed above. If there are no more search results to rank, processing continues to step 496.

The search results are then displayed on the mobile device based on the corresponding ranking values (step 496). In accordance with some embodiments of the invention, the search results are displayed in order from the search result having the highest ranking value to the search result having the lowest ranking value. Processing then terminates.

Figure 5:
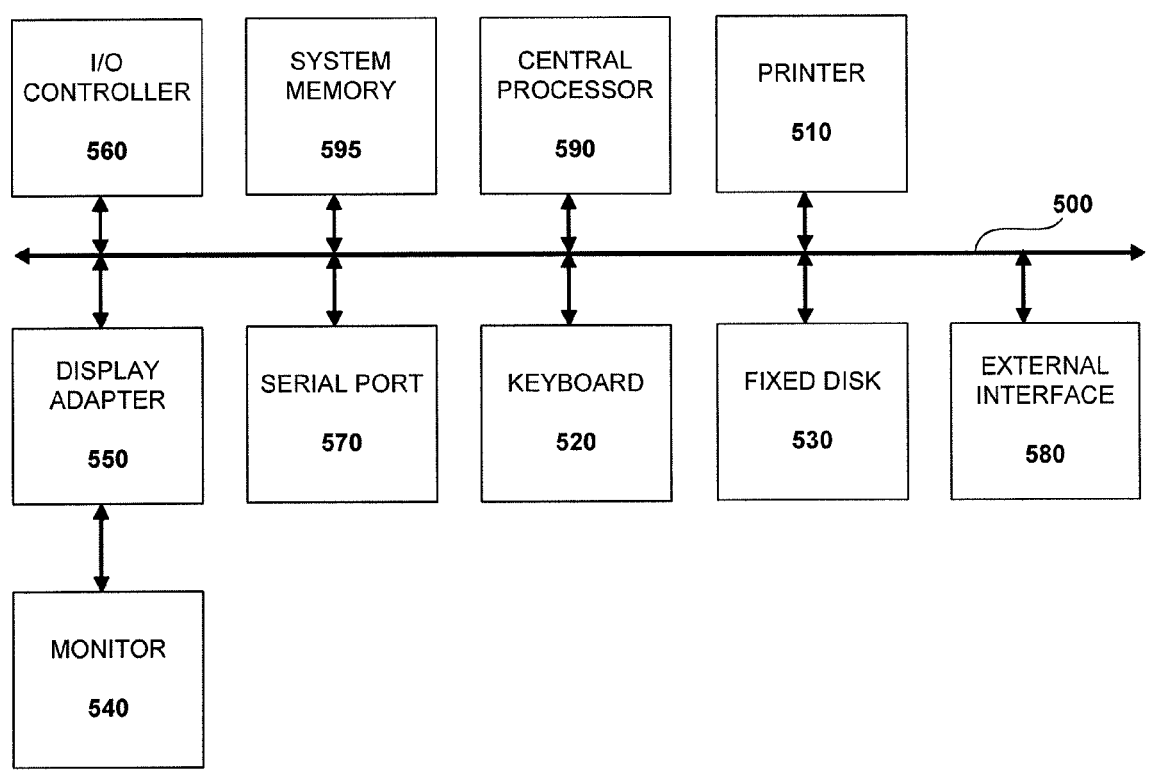
FIG. 5 is a block diagram illustrating typical components or subsystems of a computer apparatus that may be used in some embodiments of the present invention.

FIG. 5 is a block diagram illustrating typical components or subsystems of a computer apparatus that may be used in some embodiments of the present invention. Such components or any subset of such components may be present in various components shown in FIGS. 1 and 3, including the content servers 120, the browsing gateway 110, the search engine 130, etc. The subsystems shown in FIG. 5 are interconnected via a system bus 500. Additional subsystems such as a printer 510, keyboard 520, fixed disk 530, monitor 540, which is coupled to display adapter 550, and others are shown. Peripherals and input/output (I/O) devices, which couple to I/O controller 560, can be connected to the computer system by any number of means known in the art, such as serial port 570. For example, serial port 570 or external interface 580 can be used to connect the computer apparatus to a wide area network such as the Internet, a mouse input device, or a scanner. The interconnection via system bus 500 allows the central processor 590 to communicate with each subsystem and to control the execution of instructions from system memory 595 or the fixed disk 530, as well as the exchange of information between subsystems. The system memory 595 and/or the fixed disk 530 may embody a computer readable medium.

Figure 6:
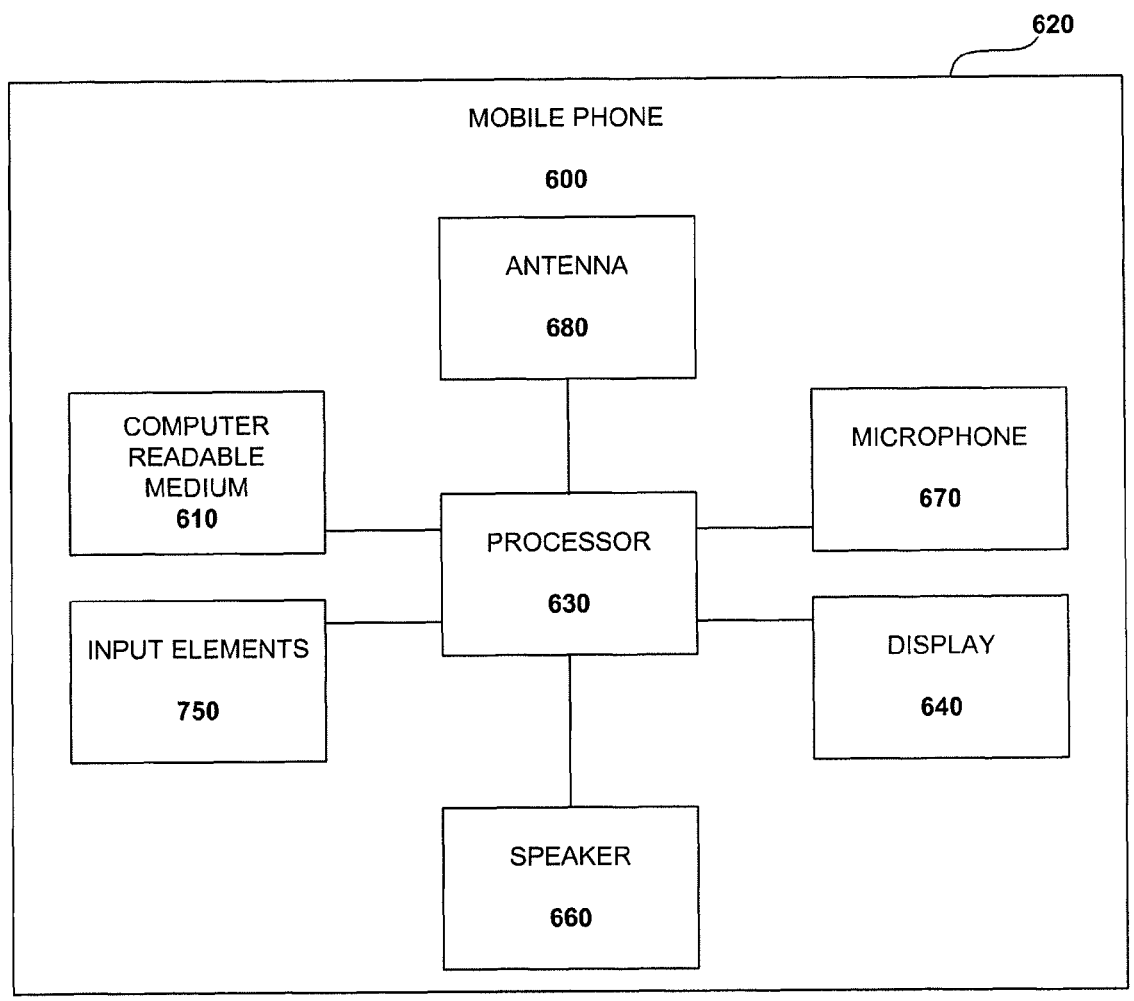
FIG. 6 shows a block diagram of some components of a mobile phone corresponding to the wireless device that may be used in some embodiments of the present invention.

FIG. 6 shows a block diagram of some components of a mobile phone corresponding to the wireless device that may be used in some embodiments of the present invention. The phone 600 may comprise a computer readable medium 610 and a body 620. The computer readable medium 610 may be present within the body 620, or may be detachable from it. The body 620 may be in the form of a plastic substrate, housing, or other structure. The computer readable medium 610 may be a memory that stores data and may be in any suitable form including a magnetic stripe, a memory chip, etc.

The computer readable medium 610 may comprise code for performing any of the functions described herein. For example, the computer readable medium 610 may comprise code for requesting a web page. The computer readable medium 610 may also comprise code for requesting a search based on search terms entered by a user.

The phone 600 may also include a processor 630 (e.g., a microprocessor) for processing the functions of the phone 600 and a display 640 to allow a user to view web pages, search results and other information and messages. The phone 600 may further include input elements 650 to allow a user to input information into the phone 600, a speaker 660 to allow the user to hear voice communication, music, etc., and a microphone 670 to allow the user to transmit her voice through the phone 600. The phone 600 may also include an antenna 680 for wireless data transfer (e.g., data transmission).

As is apparent from the above description, embodiments of the present invention utilize an internet browsing gateway to discover mobile web content and refine search capabilities of a wireless device based on browsing data of mobile devices users associated with the same wireless network or the same mobile carrier. The mobile browsing data is logged as web pages are requested from and returned to the wireless devices. An index server updates search indexes in real time based on the log data to facilitate usage of the search engine by other mobile device users associated with the same wireless network or mobile carrier.

When a web search is requested from a mobile wireless device, the index server queries the search indexes. The search results are ranked by popularity using a search algorithm that incorporates the browsing activity and usage characteristics of the mobile devices and the mobile device users to refine search result ranking and improve search accuracy and relevance. The search algorithm provides weight to each search result by increasing or decreasing a ranking value based on whether certain usage conditions are met, where such usage conditions are indicative of the value or relevance of the search results to users of mobile devices. The index server then returns the results of the query to the requesting mobile wireless device, and the search results are displayed based on the ranking values.

The present invention has been described in terms of specific embodiments. As will be understood by those skilled in the art, the embodiments illustrated above may be modified, altered, and changed without departing from the scope of the invention. The scope of the present invention is defined by the appended claims.

What is claimed is:

1. A method for discovering wireless-compatible web content from web pages that have been indexed in accordance with an indexing process, the indexing process comprising:
retrieving web pages in response to web page requests received from requesting wireless devices, wherein at least some of the retrieved web pages include wireless-compatible content, the requesting wireless devices being associated with a same wireless network;
storing usage data associated with each of the retrieved web pages;
indexing the retrieved web pages based on the associated usage data, wherein the indexed web pages include wireless-compatible content;
the method further comprising:
identifying indexed web pages in response to receiving search terms from a searching wireless device, wherein the identified web pages correspond to the received search terms;
generating a ranking value for each identified web page, wherein the ranking value is generated based on the stored usage data associated with the corresponding retrieved web page; and
refining each generated ranking value, said refining comprising:
storing a location of the searching wireless device as usage data associated with each identified web page;
in the event that the location of the searching wireless device is within a region served by the wireless network, increasing the ranking value; and
in the event that the location of the searching wireless device is not within a region served by the wireless network, decreasing the ranking value;
the method further comprising ranking the identified web pages based on the corresponding refined ranking values.

2. The method for discovering wireless-compatible web content as in claim 1, wherein the method comprises:
storing as usage data a number of times that a requesting wireless device accessed an internet domain that includes at least one of the retrieved web pages during a predetermined time period; and
refining the ranking value comprises:
in the event that the number of times that a requesting wireless device accessed an internet domain that includes at least one of the identified web pages during the predetermined time period exceeds a maximum threshold, increasing the ranking value; and
in the event that the number of times that the a requesting wireless device accessed an internet domain that includes at least one of the identified web pages during the predetermined time period does not exceed a minimum threshold, decreasing the ranking value.

3. The method for discovering wireless-compatible web content as in claim 1, wherein the method comprises:
storing as usage data identification information associated with the requesting wireless devices that requested the retrieved web pages; and
refining the ranking value comprises:
in the event that a same or a similar wireless device as one of the requesting wireless devices that requested the retrieved web pages is the searching wireless device, increasing the ranking value of the identified web pages corresponding to said retrieved web pages; and
in the event that a different and unassociated wireless device from the requesting wireless devices that requested the retrieved web pages is the searching wireless device, decreasing the ranking value of the identified web pages corresponding to said retrieved web pages.

4. The method for discovering wireless-compatible web content as in claim 1, wherein the method comprises:
storing, as usage data time stamp that identifies a time when one of the requesting wireless devices requests a retrieved web pages; and
refining the ranking value comprises:
in the event that one of the wireless devices requests the retrieved web pages at substantially the same time as a different wireless device associated with the same wireless network, increasing the ranking value of the identified web page corresponding to said retrieved web page; and
in the event that none of the wireless devices requests the retrieved web page at substantially the same time, decreasing the ranking value of the identified web page corresponding to said retrieved web page.

5. The method for discovering wireless-compatible web content as in claim 1, wherein the method comprises:
storing, as usage data a number of times that the requesting wireless devices access each retrieved web page during a predetermined time period; and
refining the ranking value comprises:
in the event that the number of times that the requesting wireless devices access each retrieved web page during the predetermined time period exceeds a maximum threshold, increasing the ranking value of the identified web page corresponding to each retrieved web page; and in the event that the number of times that the requesting wireless devices access each retrieved web page during the predetermined time period does not exceed a minimum threshold, decreasing the ranking value of the identified web page corresponding to each retrieved web page.

6. The method for discovering wireless-compatible web content as in claim 1, wherein the method comprises:

storing, as usage data a length of time that each requesting wireless device browsed each retrieved web page; and refining the ranking value comprises:

in the event that the length of time that one of the requesting wireless device browsed one of the retrieved web pages exceeds a maximum threshold, increasing the ranking value of the identified web page corresponding to said retrieved web page; and in the event that the length of time that one of the requesting wireless devices browsed the retrieved web page does not exceed a minimum threshold, decreasing the ranking value of the identified web page corresponding to said retrieved web page.

7. The method for discovering wireless-compatible web content as in claim 1, further comprising: updating the indexed web pages based on updated usage data.

8. The method for discovering wireless-compatible web content as in claim 1, further comprising:

returning the ranked web pages to the wireless device; and displaying the ranked web pages on the searching wireless device.

9. A system for discovering mobile-compatible web content, the system comprising:

a browsing gateway comprising a data collector, wherein the data collector is configured to:

retrieve web pages in response to web page requests received from requesting wireless devices, wherein at least some of the retrieved web pages include wireless-compatible content, the requesting wireless devices being associated with a same wireless network, and store usage data associated with each of the retrieved web pages; and a search engine comprising:

a web crawler configured to receive the usage data from the data collector, wherein the received usage data corresponds to the retrieved web pages that include wireless-compatible content; and an index server configured to index the retrieved web pages based on the associated usage data, wherein the indexed web pages include wireless-compatible content, wherein the index server is further configured to:

identify indexed web pages in response to receiving search terms from a searching wireless device, wherein the identified web pages correspond to the received search terms;

generate a ranking value for each identified web page, wherein the ranking value is generated based on usage data associated with the corresponding retrieved web page;

refine each generated ranking value by:

storing a location of the searching wireless device as usage data associated with each identified web page;

in the event that the location of the searching wireless device is within a region served by the wireless network, increasing the ranking value;

in the event that the location of the searching wireless device is not within a region served by the wireless network, decreasing the ranking value;

use the refined ranking to rank the identified web pages; and return the ranked web pages to the searching warless device.

10. The system for discovering wireless-compatible web content as in claim 9, wherein the index server is configured to store as usage data a number of times that a requesting wireless device accessed an internet domain that includes a retrieved web page during a predetermined time period, and wherein the index server is configured to refine the ranking value by:

in the event that the number of times that a requesting wireless device accessed an internet domain that includes an identified web page during the predetermined time period exceeds a maximum threshold, increasing the ranking value; and in the event that the number of times that a requesting wireless device accessed an internet domain that includes an identified web page during the predetermined time period does not exceed a minimum threshold, decreasing the ranking value.

11. The system for discovering wireless-compatible web content as in claim 9, wherein the index server is configured to store as usage data identification information associated with the requesting wireless devices that requested the retrieved web pages, and wherein the index server is configured to refine the ranking value by:

in the event that the same or a similar wireless device as one of the requesting wireless devices that requested the retrieved web pages is the searching wireless device increasing the ranking value of the identified web pages corresponding to said retrieved web pages; and in the event that a different and unassociated wireless device from the requesting wireless device that requested the retrieved web pages is the searching wireless device, decreasing the ranking value of the identified web pages corresponding to said retrieved web pages.

12. The system for discovering wireless-compatible web content as in claim 9, wherein the index server is configured to store as usage data a time stamp that identifies a time when the requesting wireless device requests a retrieved web page, and wherein the index server is configured to refine the ranking value by:

in the event that the requesting wireless device requests the retrieved web page at substantially the same time as a different wireless device associated with the same wireless network, increasing the ranking value of the identified web page corresponding to said retrieved web page; and in the event that the wireless device requests the retrieved web page at a distinctly different time than a different wireless device associated with the same wireless network, decreasing the ranking value of the identified web page corresponding to said retrieved web page.

13. The system for discovering wireless-compatible web content as in claim 9, wherein the index server is configured to store as usage data a number of times that the requesting wireless devices access each retrieved web page during a predetermined time period, and wherein the index server is configured to refine the ranking value by:

in the event that the number of times that the requesting wireless devices access each retrieved web page during the predetermined time period exceeds a maximum threshold, increasing the ranking value of the identified web page corresponding to each retrieved we page; and in the event that the number of times that the requesting wireless devices access each retrieved web page during the predetermined time period does not exceed a minimum threshold, decreasing the ranking value of the identified web page corresponding to each retrieved we page.

14. The system for discovering wireless-compatible web content as in claim 9, wherein the index server is configured to store as usage data a length of time that each requesting wireless device that requested each retrieved web page browsed the retrieved web page, and wherein the index server is configured to refine the ranking value by:

in the event that the length of time that the requesting wireless device browsed the retrieved web page exceeds a maximum threshold, increasing the ranking value of the identified web page corresponding to said retrieved web page; and in the event that the requesting wireless device browsed the retrieved web page does not exceed a minimum threshold, decreasing the ranking value of the identified web page corresponding to said retrieved web page.

15. The system for discovering wireless-compatible web content as in claim 9, wherein the index server is further configured to update the indexed web pages in response to receiving updated usage data from the data collector.

16. A system for discovering wireless-compatible web content, the apparatus being capable of communication and data exchange over a wireless communication network, the apparatus comprising:

a system element in communication with an element of the wireless communication network; and a processor configured to execute a process to discover wireless-compatible web content in response to a search request from a mobile device, whereby the wireless-compatible web content is provided to the element of the wireless communication network for access by the mobile device, the process comprising:

retrieving web pages in response to web page requests received from requesting wireless devices, wherein at least some of the retrieved web pages include wireless-compatible content, the requesting wireless devices being associated with the wireless communication network;

storing usage data associated with each of the retrieved web pages, wherein the usage data is stored in a data storage medium;

indexing the retrieved web pages based on the associated usage data, wherein the indexed web pages include wireless-compatible content;

identifying indexed web pages in response to receiving search terms from the mobile device, wherein the identified web pages correspond to the received search terms;

generating a ranking value for each identified web page, wherein the ranking value is generated by processing the stored usage data associated with the corresponding retrieved web page, wherein the usage data is processed after being retrieved from the data storage medium;

refining each generated ranking value, said refining comprising:

storing a location of the searching wireless device as usage data associated with each identified web page;

in the event that the location of the mobile device that sent the search terms is within a region served by the wireless communication network, increasing the ranking value; and in the event that the location of the mobile device that sent the search terms is not within a region served by the wireless communication network, decreasing the ranking value;

ranking the identified web pages based on the corresponding refined ranking values; and outputting the ranked web pages to the mobile device.

* * * * *